UNITED STATES PATENT OFFICE.

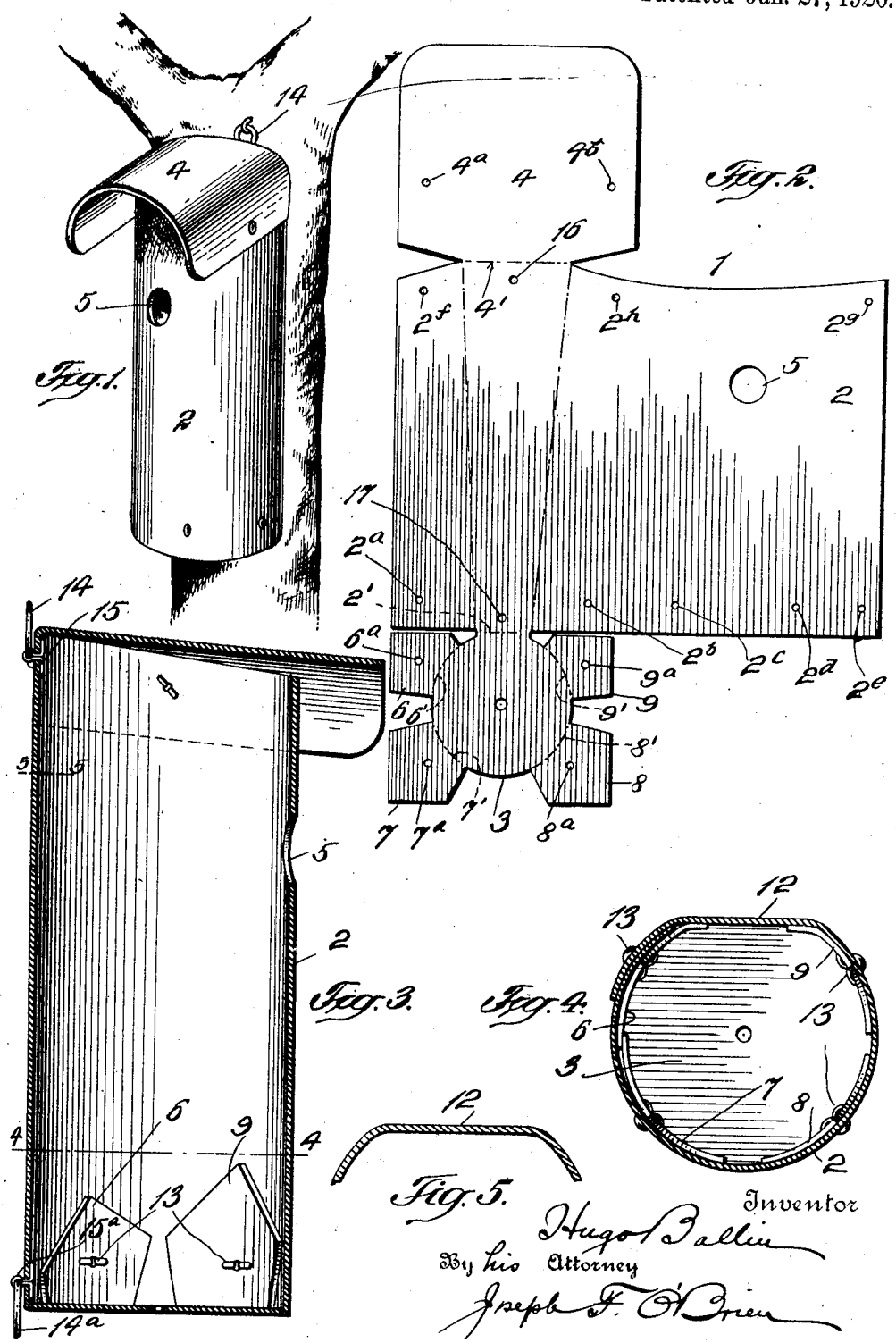

HUGO BALLIN, OF NEW YORK, N. Y.

BIRD-HOUSE.

1,329,104.  Specification of Letters Patent.  Patented Jan. 27, 1920.

Application filed January 30, 1917. Serial No. 145,343.

*To all whom it may concern:*

Be it known that I, HUGO BALLIN, a citizen of the United States, and a resident of the borough of Manhattan, county of New York, and State of New York, have invented certain new and useful Improvements in Bird-Houses, of which the following is a specification.

This invention relates to improvements in bird houses.

By the use of my invention, I produce a collapsible bird house which, in collapsed condition, comprises flat parts, viz., a body, roof and floor, preferably composed of a durable flexible weather-proof material having relatively low heat conductivity such as prepared roofing, the said flat parts being adapted to be manually bent to produce a completely erected bird house and to be detachably fastened together when so erected.

The preferred form of my collapsible bird house comprises in collapsed condition a single flat piece of flexible material, which, as illustrated, when manually bent into erected condition provides a substantially cylindrical body, a circular floor and a roof, all formed in one piece with hinge-like connecting webs therebetween. The floor and roof are respectively provided with integral flanges which are adapted to be detachably connected to the body or side wall of the bird house so as to retain the same in its completed or erected condition, while at the same time permitting the ready collapsing or taking down of the house and the shipment thereof through the mails in flattened condition.

In the accompanying drawings, in which similar reference characters designate corresponding parts throughout the several views, Figure 1 is a view of a bird house embodying my invention, when the same is completed and attached to a tree.

Fig. 2 is a plan view of a piece of material in flat condition cut to provide the walls, roof and floor and the connecting flanges of my improved bird house.

Fig. 3 is a longitudinal section of a bird house in completed condition.

Fig. 4 is a section on the line 4—4 of Fig. 3 and Fig. 5 is a section on the line 5—5 of Fig. 3.

Referring now to these drawings, 1 indicates a piece of the material for erecting my improved bird house, which comprises a flat sheet of flexible and water-proof material preferably having heat-insulating qualities, which sheet is cut or stamped up to provide a body portion 2, a floor 3 and a roof 4, all formed in one piece.

The body portion 2 is provided with an entrance aperture 5, and is sufficiently long to provide a cylindrical wall or body portion as shown in Figs. 1, 3 and 4. The floor is, as illustrated, provided with a series of radiating flanges 6, 7, 8 and 9 which are respectively provided with connecting apertures $6^a$, $7^a$, $8^a$ and $9^a$, the said connecting apertures being adapted when the radiating flanges 6, 7, 8 and 9 are folded upwardly in relation to the bottom 3 and when the said bottom is folded at right angles to body portion 2, to register respectively with the connecting apertures $2^a$, $2^b$, $2^c$, $2^d$ and $2^e$ provided in the lower rim of the body portion, the apertures $2^a$, $2^e$ and $6^a$ being adapted to register with each other and to be connected by a single fastener. The roof 4 is provided with apertures $4^a$ and $4^b$ at the opposite side marginal portions thereof, which marginal side portions thereof are adapted when the bird house is erected to form downwardly extending water-shedding flanges, and the aperture $4^a$ is adapted to register with apertures $2^f$ and $2^g$ respectively at the upper edge of the body portion or wall, so that a single fastener may be passed therethrough and connect the two side edges of the body portion and this flange of the roof together, while the aperture $4^b$ is adapted to register with the aperture $2^h$ also contiguous to the upper edge of the body portion so that a fastener may be passed therethrough and the flanges and walls may be retained in proper relative positions.

In order to erect the house, it will be obvious that the radiating flanges 6, 7, 8 and 9 may be turned up along the dotted lines $6'$, $7'$, $8'$ and $9'$ and that the floor 3 may be bent upwardly along the dotted line $2'$, while the roof 4 will be folded down along the line $4'$. The portions of the material along the dotted lines $2'$ and $4'$ will form hinges between the body 2 and the floor 3 and the roof 4 respectively.

When the parts are bent into erected position, as shown in parts 1, 3, 4 and 5, that portion of the walls or body 2 between the vertically disposed dotted lines 10 and 11 will form a flattened back 12 (see Figs. 4 and 5), which will assist in preventing rotation of the bird house in relation to the tree post or other object to which it is attached.

As shown, the floor and roof are, when the bird house is in knocked-down or collapsed condition, attached to the body at one side of the middle of the sheet or piece of material forming the body and the side edges are when in erected condition suitably overlapped to provide a close joint, and edges of the body, roof and the floor are connected together by means of detachable fasteners 13. Rings 14 and 14ª, having fastening members 15 and 15ª, are preferably provided and connected at the rear portion 12 of the said house for attaching the same, suitable apertures 16 and 17 being provided to permit ready attachment to the bird house of said rings.

Obviously my invention is not limited to the precise construction of bird house herein shown and described and many modifications of such construction may be made without departing from the spirit of my said invention.

Having described my invention, I claim:

1. A collapsible bird house formed, in collapsed condition, of flat portions of flexible, weather-proof material adapted to be manually bent and connected together to form a completely erected bird house comprising a body portion having an entrance aperture, and adapted to be manually bent into tubular conformation; a floor portion fitting within said tubular body portion; a roof portion adapted to embrace the outer surfaces of said tubular body portion at opposite sides thereof and to close the upper end of said tubular body portion against the admission of rain and also to shed water coming in contact with said roof portion; means for detachably connecting the floor portion within the body portion; and means for detachably connecting the roof portion to the outside of the body portion at opposite sides thereof.

2. A collapsible bird house formed of a single flat blank of suitable, flexible, weather-proof material cut and adapted to be manually folded to provide a body portion having an entrance aperture intermediate its top and bottom edges and registering fastening apertures along its side edges and also fastening apertures contiguous to its top and bottom edges, said body portion being adapted to be bent in tubular conformation; a floor portion fitting within the tubular body portion when erected and having flanges, each provided with a fastening aperture registering with the apertures contiguous to the bottom of said body portion; and a roof portion adapted to embrace the outer sides of said body portion and having fastening apertures registering with the apertures contiguous to the top of the body portion; and detachable fasteners adapted to coöperate with the registering fastening apertures in the aforesaid portions.

3. A collapsible bird house formed of a single flat blank of suitable, flexible, weatherproof material cut to provide a body portion adapted to be folded into substantially cylindrical conformation with a flat back panel; a floor portion connected to said back panel portion and adapted to fit within said cylindrical body portion and to be secured on the inner surface thereof; and a roof portion also connected to said back panel portion and adapted to embrace the outer surface of the cylindrical body portion at opposite sides thereof and to project outwardly beyond the same at the front thereof.

In witness whereof, I have signed my name to the foregoing specification in the presence of two subscribing witnesses.

HUGO BALLIN.

Witnesses:
 LILLIAN KAPLAN,
 FREDERICK P. RANDOLPH.